United States Patent [19]

Matsui

[11] Patent Number: 5,728,407
[45] Date of Patent: Mar. 17, 1998

[54] DIE FOR MELT-BLOWING APPARATUS

[75] Inventor: Yasuhiro Matsui, Ibaraki, Japan

[73] Assignee: Japan Vilene Company, Ltd., Tokyo, Japan

[21] Appl. No.: 653,482

[22] Filed: May 24, 1996

[30] Foreign Application Priority Data

May 26, 1995 [JP] Japan ................... 7-152612

[51] Int. Cl.$^6$ ................... B29B 9/06; B29C 47/78
[52] U.S. Cl. ................... 425/7; 264/12; 264/40.6; 264/211.14; 425/72.2; 425/144; 425/378.2; 425/379.1; 425/382.2; 425/464
[58] Field of Search ................... 425/7, 66, 72.2, 425/140, 141, 144, 145, 378.2, 379.1, 382.2, 464, DIG. 17; 264/12, 40.6, 40.7, 210.8, 518, 211.14, 555, DIG. 28; 65/524, 454, 466, 488

[56] References Cited

U.S. PATENT DOCUMENTS

| | | | |
|---|---|---|---|
| 3,761,553 | 9/1973 | Richardson | 425/144 |
| 3,866,669 | 2/1975 | Gardiner | 425/144 |
| 5,196,207 | 3/1993 | Koenig | 425/72.2 |
| 5,260,003 | 11/1993 | Nyssen et al. | 264/12 |
| 5,487,655 | 1/1996 | Frey et al. | 425/72.2 |

FOREIGN PATENT DOCUMENTS

| | | |
|---|---|---|
| 0 474 422 | 3/1992 | European Pat. Off. |
| 6-166944 | 6/1994 | Japan |
| 6-184805 | 7/1994 | Japan |
| 2 073 098 | 10/1981 | United Kingdom |

OTHER PUBLICATIONS

Holman, J.P., Heat Transfer, 7th ed., McGraw-Hill Publishing Co., NY, pp. 1-22, 1990.

Primary Examiner—Jay H. Woo
Assistant Examiner—Joseph Leyson
Attorney, Agent, or Firm—Sughrue, Mion, Zinn, Macpeak & Seas, PLLC

[57] ABSTRACT

A die for melt-blowing apparatus, which has a die body, a nozzle piece, and a lip plate. The nozzle piece is divided into plural temperature-controlling regions in a direction crosswise to a spinning direction. A temperature sensor is used to measure the temperature at a portion surrounding a nozzle orifice in the nozzle piece in each of the divided temperature-controlling regions. A heated gas is applied directly to the nozzle piece for controlling the temperature of the portion surrounding the nozzle orifice to a predetermined temperature. Using this die body, a melt-blown non-woven fabric with a uniform distribution of the weight per unit area can be easily obtained.

6 Claims, 6 Drawing Sheets

DIE FOR MELT-BLOWING APPARATUS

BACKGROUND OF THE INVENTION

1. Field of the Invention

The present invention relates to a die for a melt-blowing apparatus.

2. Description of the Related Art

In a melt-blowing apparatus for manufacturing a nonwoven fabric by spinning, a die is a main portion constituting a spinning station. The die is an assembly for manufacturing a melt-blown nonwoven fabric by extruding resins which have been melted by heating, i.e., melted resins, through nozzle orifices which are located in a straight line crosswise to a spinning direction, and at the same time blowing heated gas at a high speed. In a melt-blowing apparatus, it is generally necessary to supply melted resins through a relatively thick tube disposed within the die and then extrude the resins through a number of thin nozzle orifices. To connect the thick supplying tube and the nozzle orifices, a coat-hanger-style distributor is disposed therebetween. The distributor has a shape similar to that of a hanger for coats or garments. It can gradually distribute melted resins supplied from an outlet of the supplying tube, which outlet is located at a position corresponding to a portion for supporting a neck part of the coat in the coat hanger, to middle portions corresponding to portions for supporting shoulders of the coat in the coat hanger, or a further middle portion corresponding to a void space between said shoulder supporting portions in the coat hanger, and finally distribute a necessary amount of the melted resins to the nozzle orifices which are located in a straight line at a position corresponding to a bar for supporting trousers in the coat hanger.

In general, a die for a melt-blowing apparatus comprises (1) a die body, (2) a nozzle piece which is detachably attached to the die body, and contains a group of nozzle orifices, and (3) a lip plate which is detachably attached to both the die body and the nozzle piece, which forms a channel for heated gas in a gap between the nozzle piece and the lip plate around at least the nozzle orifices or in the vicinity thereof, and which forms a spinning opening near outlets of nozzle orifices. The coat-hanger-style distributor is formed in the die body. The melted resins are distributed in the coat-hanger-style distributor, moved in parallel in guiding flow paths within the nozzle piece to the nozzle orifices at the edge thereof, and spun from the spinning opening formed by the nozzle piece and the lip plate.

To obtain a melt-blown nonwoven fabric having a uniform distribution of a weight per unit area in a direction crosswise to a spinning direction, namely having a uniform thickness, it is necessary to uniformly spin the melted resins from the outlets of the nozzle orifices. In conventional methods, therefore, the bore diameter and the length of each nozzle orifice were made identical to each other. Further, the coat-hanger-style distributor was divided into plural temperature-controlling regions in a lateral direction, a temperature sensor was disposed in each temperature-controlling region and a heater for heating the die was also mounted at the side of or within the die body to control the temperature of the melted resin passing in each temperature-controlling region and maintaining the constant temperature of the melted resins moving in the die.

In the above conventional methods, however, it was not possible to uniformly spin the melted resin from the orifices, even if the temperature of the melted resin moving in the die was controlled to be uniform at the coat-hanger-style distributor. When there was a portion with the smaller amount of the resins spun in a lateral direction, the temperature of the corresponding portion in the coat-hanger-style distributor was practically raised so as to gather the flow of the melted resin in the distributor into the above portion.

However, the inside structures of temperature-controlling regions divided in a lateral direction of the die are different from each other, and thus the thermal conductivities thereof are different from each other. Further, it is too time-consuming to transfer the heat from the heater to the portion around the nozzle orifices and stabilize the heat there. Therefore, in the conventional methods wherein the coat-hanger-style distributor was heated by the heater, it was very difficult to rapidly and accurately control the temperature of the melted resin at the nozzle orifices.

Further, the temperature sensor was located in the coat-hanger-style distributor to measure the melted resin laterally distributed and moved. However, the inventor of the present invention found that the correlation between the temperature of the melted resin at the distributor and the amount of the melted resin spun from the nozzle orifice is different from the the divided region to the divided region, and thus, the amount of the melted resin spun cannot be accurately controlled by controlling the temperature of the melted resin at the coat-hanger-style distributor.

Still further, in the conventional methods as above, the adjustment was not able to be effected until the melt-blown nonwoven fabric was manufactured and the weight per unit area was measured. Thus, the time lag was too large to practically effect such an adjustment.

SUMMARY OF THE INVENTION

The inventor of the present invention engaged in intensive studies to remedy the above problems, and as a result, found that it is not sufficient to control the temperature of the melted resin at the coat-hanger-style distributor, and that the amount of the melted resin spun from each nozzle orifice can be accurately controlled by measuring and controlling the temperature of the portion surrounding the nozzle orifice. The present invention is based on the findings.

Accordingly, the object of the present invention is to provide a die for a melt-blowing apparatus which can accurately control the amount of the melted resin spun from each nozzle orifice to obtain a nonwoven fabric having a uniform thickness.

Other objects and advantages will be apparent from the following description.

In accordance with the present invention, there is provided a die for a melt-blowing apparatus, comprising a die body, a nozzle piece, and a lip plate, wherein said nozzle piece is divided into plural temperature-controlling regions in a direction crosswise to a spinning direction, a means for measuring a temperature at a portion surrounding a nozzle orifice in said nozzle piece is disposed for each of said divided temperature-controlling regions, and a means for controlling said temperature at said portion surrounding said nozzle orifice to a predetermined temperature by applying heat directly to said nozzle piece in association with said measuring means is disposed.

DESCRIPTION OF THE PREFERRED EMBODIMENTS

The die for a melt-blowing apparatus in accordance with the present invention will be explained in detail by, but is by no means limited to, the drawings.

Figure 1:
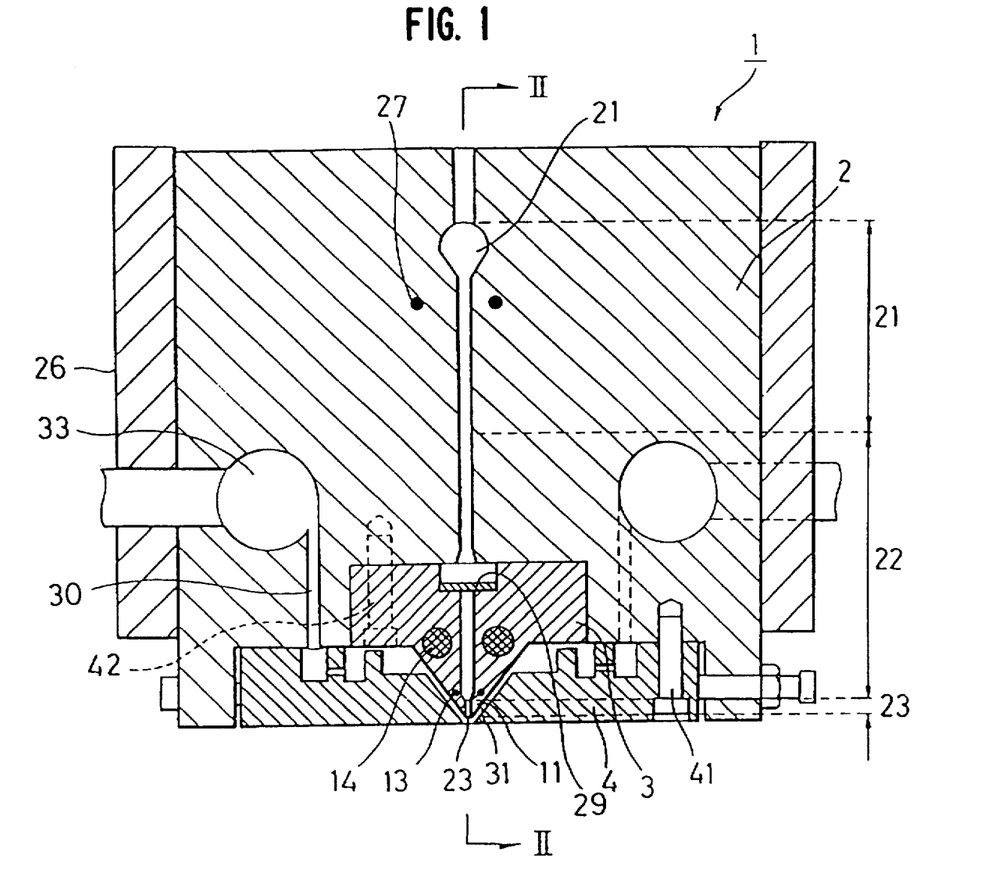
FIG. 1 is a sectional view schematically illustrating a die for a melt-blowing apparatus in accordance with the present invention, taken along a line crosswise to a spinning direction.
Figure 2:
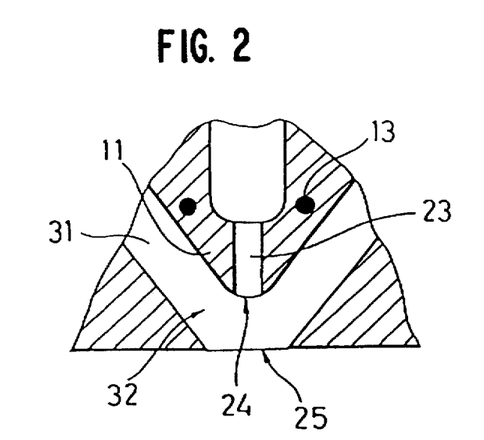
FIG. 2 is an enlarged sectional view schematically illustrating a spinning opening in the die of FIG. 1.
Figure 3:
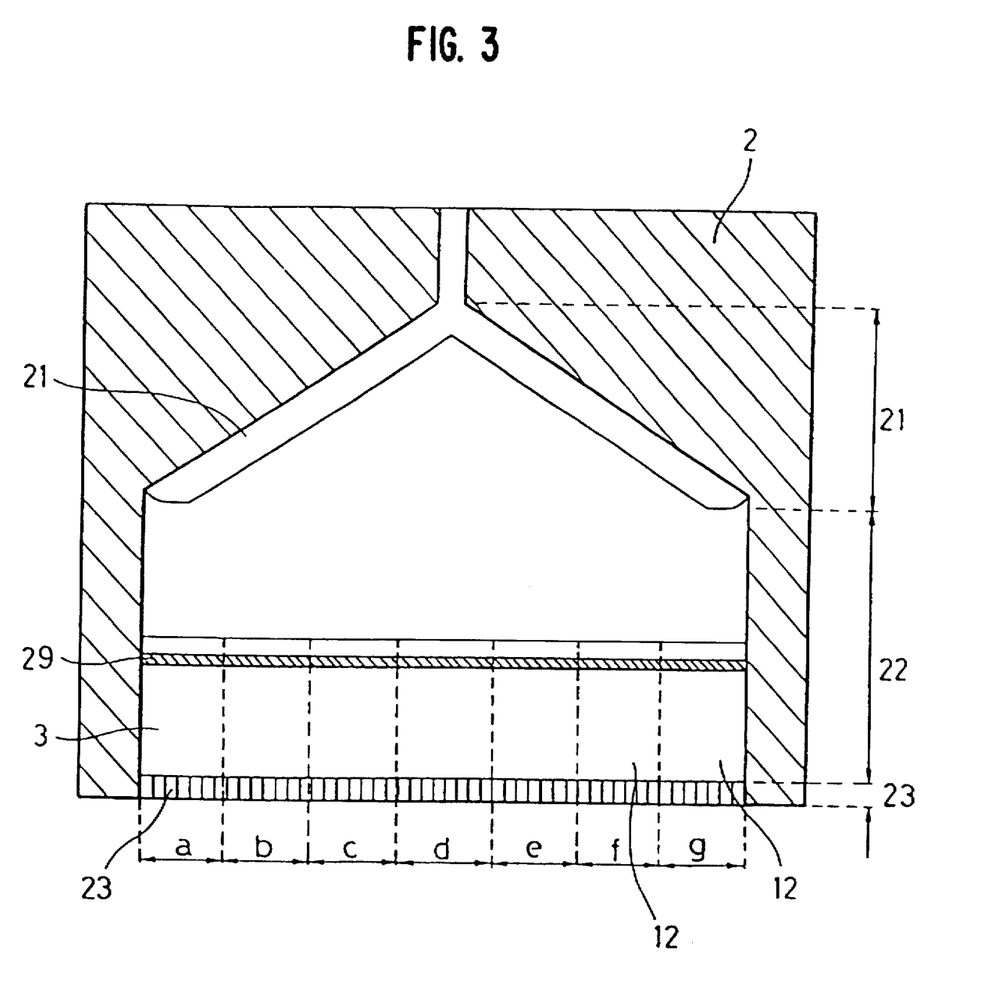
FIG. 3 is a sectional view taken along line II—II of FIG. 1.

One embodiment of the present invention is illustrated in FIGS. 1 to 3.

The term "direction crosswise to a spinning direction" used herein means a width direction of a nonwoven fabric spun from the melt-blowing apparatus, namely the direction locating the nozzle orifices in a straight line, and concretely the direction vertical to the sheet surface of FIG. 1, or the direction from the right side to the left side on the sheet surface of FIG. 3.

In the die 1, a coat-hanger-style distributor 21, a middle guiding portion 22, and a number of nozzle orifices 23, through all of which melted resin pass, are disposed. A flow path for melted resin in the die 1 is formed by the die body 2 and the nozzle piece 3. The coat-hanger-style distributor 21, and a part, i.e., an upper part, of the middle guiding portion 22 are formed in the die body 2, whereas the remaining part, i.e., a lower part, of the middle guiding portion 22 and the nozzle orifices 23 are formed in the nozzle piece 3. The middle guiding portion 22 may be involved as a whole only in the nozzle piece 3. A filter 29 is preferably disposed in the middle position of the middle guiding portion 22 to prevent clogging of the nozzle orifices 23. The melted resin supplied to the die body 2 are gradually distributed all over in the direction crosswise to a spinning direction in the coat-hanger-style distributor 21, conveyed via the middle guiding portion 22 to the nozzle orifices 23 located in a straight line, and then extruded from nozzle orifice outlets 24. If necessary, the temperature of the die body 2 or the temperature of the melted resin passing through the coat-hanger-style distributor 21 may be raised to or maintained at a predetermined temperature by heaters 26 located at the sides of the die or one or more heaters (not shown) located surrounding the coat-hanger-style distributor 21. The die body 2 and the nozzle piece 3 are detachably attached to each other by an attaching means 42. Further, the lip plate 4 is detachably attached to the lower part of the die body 2 by an attaching means 41 so that gas flow paths are formed by the nozzle piece 3 and the lip plate 4. Heated gas which may be heated at the outside or inside of the die 1 is supplied to the die body 2, distributed in gas supplying tubes 33 placed in the die body 2 to the direction crosswise to the spinning direction, conveyed through the gas flow paths 31, and blown from the gas flow outlets 32 formed adjacently to the nozzle orifice outlet 24. The melted resin extruded from the nozzle orifice outlet 24 are drawn to fine fibers by heated gas blown at a high speed from the gas flow outlets 32, and discharged as resin fibers from the spinning opening 25.

The nozzle-orifice-surrounding portion 11 means an area located at the tip of the nozzle piece 3 where the nozzle orifices 23 are formed in the die 1. The nozzle orifices are disposed in a straight line, and thus, the nozzle-orifice-surrounding portion 11 is a linear region surrounding a series of all the nozzle orifices. The shape and size of the nozzle orifice per se in the present apparatus may be the same as those of the nozzle orifice in the conventional melt-blowing apparatus. In general, the bore diameter of the nozzle orifice is, for example, about 0.1 to 1 mm, preferably 0.1 to 0.5 mm, and the length of the nozzle orifice is, for example, about 1 to 10 mm. The nozzle orifices may be disposed in a straight line crosswise to the spinning direction, for example, at a density of about 500 to 3000 orifices/m, preferably 500 to 2000 orifices/m, at an interval of about 0.5 to 2 mm (from the center of a cross-section of a nozzle orifice to the center of a cross-section of the adjacent nozzle orifice).

The nozzle piece 3 is located at the lower portion of the die body 2, and forms the nozzle orifices in a straight line, and preferably a part (the lower part) of the middle guiding portion 22. The shape and size of the nozzle piece per se in the present apparatus may be the same as those of the nozzle piece in the conventional melt-blowing apparatus. In general, the longitudinal length or the height (i.e., the length in the top-and-bottom direction on the FIG. 1 sheet) of the nozzle piece is, for example, about 10 to 150 mm, preferably 30 to 100 mm, and the lateral length or the width (i.e., the length of the right-and-left direction on the FIG. 3 sheet) of the nozzle piece is generally about 10 to 300 cm, preferably 10 to 150 cm.

In the present die apparatus, the nozzle piece 3 as a whole is divided into plural temperature-controlling regions or zones 12 along a line crosswise to the spinning direction. FIG. 3 illustrates one embodiment wherein the nozzle piece 3 as a whole is divided into seven temperature-controlling zones 12, namely zones a to g. The temperature-controlling zone is a regional unit wherein the temperature of the zone is controlled to a predetermined temperature by a means for directly or indirectly measuring the temperature of the zone, and a means for controlling the temperature of the zone. The temperature-controlling means may be placed in the zone or brought into contact with the surface of the zone. Therefore, the temperature-controlling zone does not contain a concrete structural means to separate from each other, except that the temperature-measuring means and the temperature-controlling means are disposed. The temperature of an individual nozzle orifice is controlled not only by a particular temperature-controlling means disposed for a particular temperature-controlling zone, but also by one or more of temperature-controlling means disposed for one or more temperature-controlling zones adjacent thereto. Accordingly, the temperature-controlling zone means a regional unit receiving the temperature control by one or more temperature-measuring means and one or more temperature-controlling means. The dashed lines or the zones separated thereby shown in FIG. 3 are only a convenient representation for purposes of the explanation of the present invention, and thus are not actually observed.

In the present die apparatus, the number of the divided temperature-controlling zones, the size of the individual zones, the predetermined temperature to be controlled, or the like are selected so that the advantageous effects of the present invention can be obtained, namely, the amount of the melted resin spun from the nozzle orifices is uniform. The selection may be appropriately made by one or more simple pilot tests. The present inventor found that the size of the temperature-controlling zone is generally 2 to 20 cm, preferably 5 to 15 cm in the direction crosswise to the spinning direction. If the size is less than 2 cm, it is necessary to use many means for measuring and controlling the temperature, and the die apparatus becomes a complicated apparatus which is difficult to manufacture. If the size is more than 20 cm, it is difficult to accurately control the amount of the melted resin spun in the width direction. The zone may be divided in different widths, but preferably in a same width.

The means for directly or indirectly measuring the temperature of the nozzle-orifice-surrounding portion in the nozzle piece are disposed for each of the temperature-controlling zones 12 (zones a to g). The temperature-measuring means is not limited, so long as it can directly or indirectly measure the nozzle-orifice-surrounding portion. The means for directly measuring the temperature of the nozzle-orifice-surrounding portion is, for example, an embedding-type temperature-measuring means, such as an embedding-type temperature sensor 13, located within the nozzle piece 3, as shown in FIG. 1. The position where the embedding-type temperature sensor 13 is embedded is not limited so long as it is within the nozzle piece 3. Preferably, the embedding-type temperature sensor 13 is embedded as near as possible to the nozzle orifice outlet 24. For example, the embedded position is preferably within 60 mm, more preferably within 40 mm of the nozzle orifice outlet 24. It is sufficient to use one embedding-type temperature-measuring means in each temperature-controlling zone 12, but plural means may be used. The temperature sensor used as the embedding-type temperature-measuring means may be a known temperature sensor, such as a thermocouple or a temperature-measuring resistance element.

Figure 4:
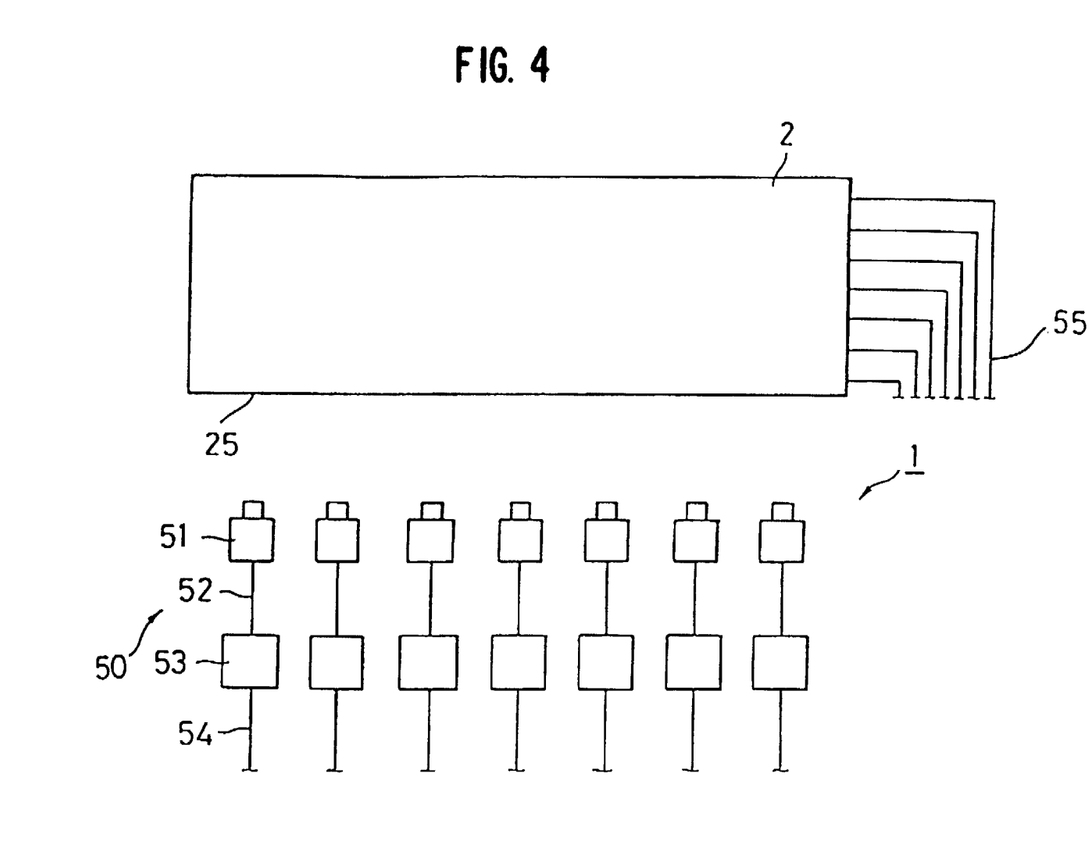
FIG. 4 is a plane view schematically illustrating a die for a melt-blowing apparatus in accordance with the present invention, wherein an infrared radiation thermometer is used as a means for measuring a temperature.

The means for indirectly measuring the temperature of the nozzle-orifice-surrounding portion 11 may be, for example, a non-contacting type temperature-measuring means 50 which is located apart from the die body 2, the nozzle piece 3 and the lip plate 4, and which is disposed oppositely to the spinning opening 25, as shown in FIG. 4, and further which can receive infrared radiation emitted from the nozzle-orifice-surrounding portion 11. The non-contacting type temperature-measuring means 50 may be, for example, an infrared radiation thermometer or an infrared thermal imaging apparatus (thermography). The infrared radiation thermometer 50 comprises, for example, a measuring part 51 receiving the infrared radiation emitted from the nozzle-orifice-surrounding portion 11, and a controller 53 electrically connecting to the measuring part 51 via a conductor wire 52. The measuring part 51 converts the amount of the infrared radiation received to a potential signal and convey the same as a digital signal to the controller 53 where a calculation, such as adjustment, is effected. Then, a control signal may be conveyed via conductor wires 54, 55 to the temperature-controlling means.

In FIG. 4, an embodiment wherein an infrared radiation thermometer 50 as the non-contacting type temperature-measuring means is disposed for each temperature-controlling zone is shown. Plural infrared radiation thermometers 50 may be disposed for each temperature-controlling zone. When, for example, the infrared thermal imaging apparatus is used, all the infrared radiation emitted from the temperature-controlling zones may be collectively received by a light-receptor, such as an infrared camera, and the amounts of the infrared radiation received may be divided to each temperature-controlling zone by a calculating portion so as to control each of the temperature-controlling means disposed for each temperature-controlling zone, respectively.

The means for directly or indirectly measuring the temperature of the nozzle-orifice-surrounding portion in the nozzle piece, for example, the embedding-type temperature-measuring means and/or the non-contacting type temperature-measuring means, such as the infrared radiation thermometer and/or the infrared thermal imaging apparatus, may be used alone, or in combination thereof for each temperature-controlling zone or some temperature-controlling zones.

In the present die apparatus, the means for controlling the temperature of the nozzle-orifice-surrounding portion to the determined temperature (hereinafter sometimes referred to as the nozzle-orifice-portion-temperature-controlling means), particularly a heating means, may be disposed. For example, an embedding-type heater 14 (FIG. 1) may be disposed in the nozzle piece 3, or a surface-mounting-type heater (not shown) may be located on the surface of the nozzle piece 3. The position where the nozzle-orifice-portion-temperature-controlling means is located is preferably in the nozzle piece rather than on the surface of the nozzle piece, more preferably within 100 mm, particularly 60 mm, of the nozzle orifice outlet 24. It is sufficient to use an embedding-type heater 14 or a surface-mounting-type heater for a temperature-controlling zone, but plural heaters may be used for a temperature-controlling zone. When the nozzle-orifice-portion-temperature-controlling means placed within the nozzle piece 3 is used in combination with the embedding-type temperature sensor 13, the position where the nozzle-orifice-portion-temperature-controlling means is located is not limited, so long as it is located within the nozzle piece 3 but preferably near the temperature sensor 13. FIG. 1 illustrates a preferred embodiment wherein the temperature sensor 13 is located near the nozzle orifice outlet 24, and the heater is located closer to the coat-hanger-type distributor. It is possible to locate the heater near the outlet 24, and the temperature sensor 13 closer to the distributor.

The embedding-type or surface-mounting-type heater may be concretely a heater with an electrically heated wire, such as a sheathed heater, a cartridge heater or a cast-in heater, or heat transfer oil capable of separately controlling the temperature of each zone.

The embedding-type or non-contacting type temperature-measuring means can directly or indirectly measure the temperature of the nozzle-orifice-surrounding portion 11 in the temperature-controlling zone 12 where the means is located, namely where the means is assigned for. Then, the heating conditions of the heater in association with the corresponding temperature-measuring means is adjusted in accordance with the difference to the predetermined temperature (in general, the same temperature in each zone) so that the temperature of the nozzle-orifice-surrounding portion 11 in each temperature-controlling zone 12 is maintained at the predetermined temperature. The combination of the temperature-measuring means and the heater associated therewith can control the temperature independently of the other combinations of the temperature-measuring means and the heaters associated therewith, and the temperature profile of the nozzle piece 3 in the direction crosswise to the spinning direction can be accurately controlled. Particularly, when the embedding-type temperature sensor 13 is used, it can be located sufficiently near the nozzle orifice outlet in the nozzle piece 3. Therefore, the temperature at the position where the temperature sensor 13 is located can be controlled to be substantially the same as that of the temperature of the melted resin in the nozzle orifices, not only when the temperature sensor 13 is located in the nozzle-orifice-surrounding portion 11, but also when the temperature sensor 13 is not located in the nozzle-orifice-surrounding portion 11 (but within the nozzle piece 3).

In the conventional methods, an apparatus similar to the present die apparatus shown in FIGS. 1 and 3 was used. However, the temperature sensor 27 was located in each temperature-controlling zone of the coat-hanger-type distributor to control the temperature thereabout by heating the whole melted resin in the die 1 to a constant temperature, using, for example, a side heater 26 placed on the side of the die body 2 or a coat-hanger-distributor-heater (not shown) embedded in the position surrounding the coat-hanger-type distributor for each divided temperature-controlling zone. In the present die apparatus, on the contrary, the nozzle-orifice-portion-temperature-controlling means, such as a heater, is newly disposed in the nozzle piece or is newly brought into contact with the nozzle piece, instead of or preferably in addition to the side heater 26 and/or the coat-hanger-distributor-heater used in the conventional methods. It is sufficient to heat the melted resin approximately to the predetermined temperature by the side heater 26 and/or the coat-hanger-distributor-heater, when used, in the present die apparatus. Therefore, it is not necessary to dispose such a heater for each temperature-controlling zone, but such a heater may be disposed for each temperature-controlling zone as in the conventional methods. Further, an approximate control of the temperature for each temperature-controlling zone may be carried out by disposing the temperature-measuring means in each temperature-controlling zone of the coat-hanger-type distributor. In the present die apparatus, a side heater 26 or a coat-hanger-distributor-heater may be disposed in the whole apparatus when the portion of the coat-hanger-type distributor is not divided into the temperature-controlling zones, or one or more of the heaters may be disposed for each temperature-controlling zone.

As the nozzle-orifice-portion-temperature-controlling means, particularly a heating means, which is brought into contact with the surface of the nozzle piece, heated gas which is guided in the gas supplying path 30 in the die 1, conveyed through the gas path 31 contacting the nozzle piece 3, and blown from the gas outlet 32, may be used in the present die apparatus, instead of or in addition to the embedding-type heater 14 disposed in the nozzle piece 3 and/or the surface-mounting-type heater disposed on the surface of the nozzle piece 3. That is, the heated gas blown at a high speed from the gas flow outlet 32 for the purpose of drawing the melted resin extruded from the nozzle orifice outlet to fine fibers in the present apparatus shown in FIGS. 1 to 3, or in the similar conventional apparatus may also be used as the temperature-controlling means for appropriately adjusting the temperature. In this embodiment, it is preferable to use the side heater 26 (FIG. 1) and/or the coat-hanger-distributor-heater in combination therewith.

Figure 5:
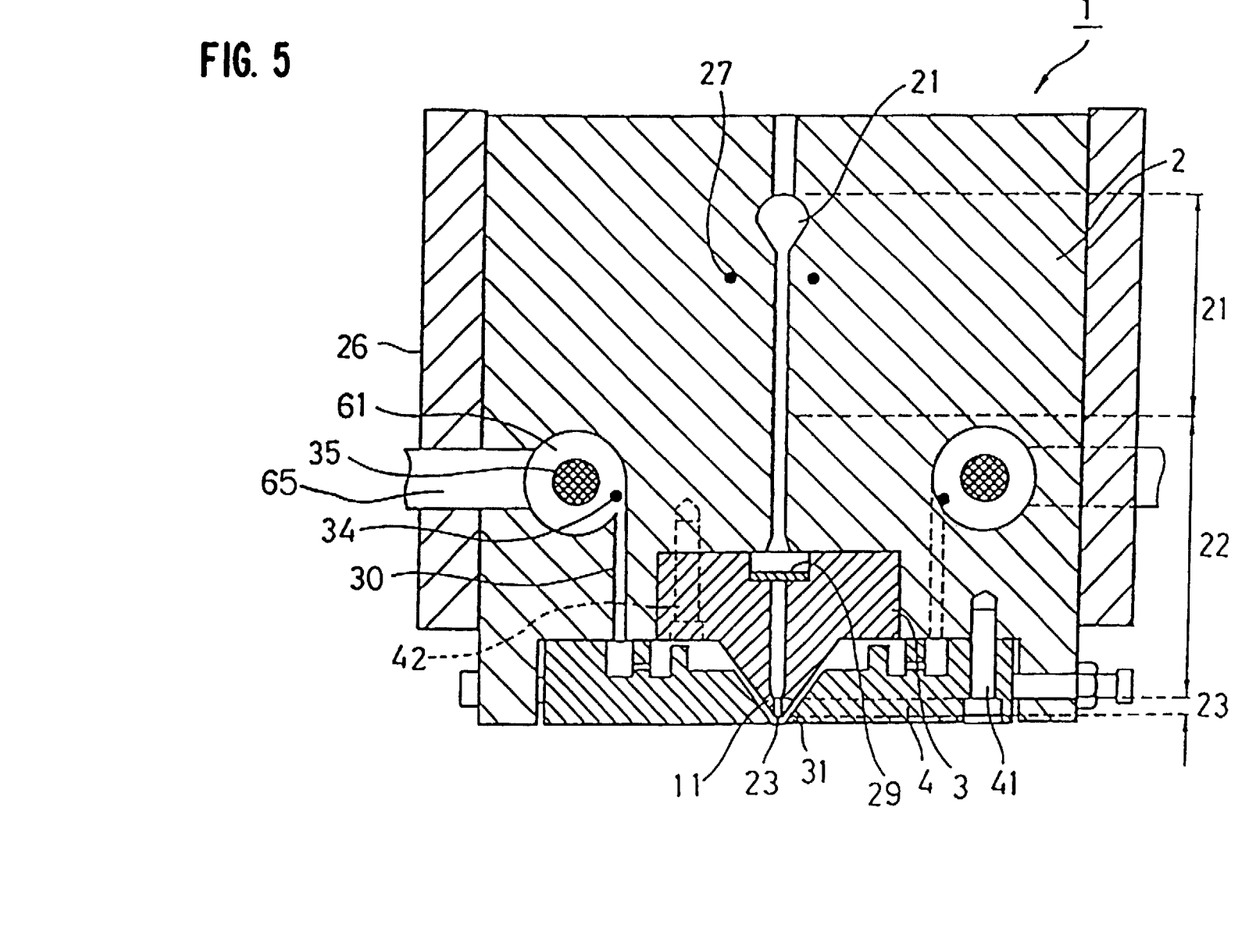
FIG. 5 is a sectional view schematically illustrating a die for a melt-blowing apparatus of another embodiment in accordance with the present invention, taken along a line crosswise to a spinning direction.
Figure 6:
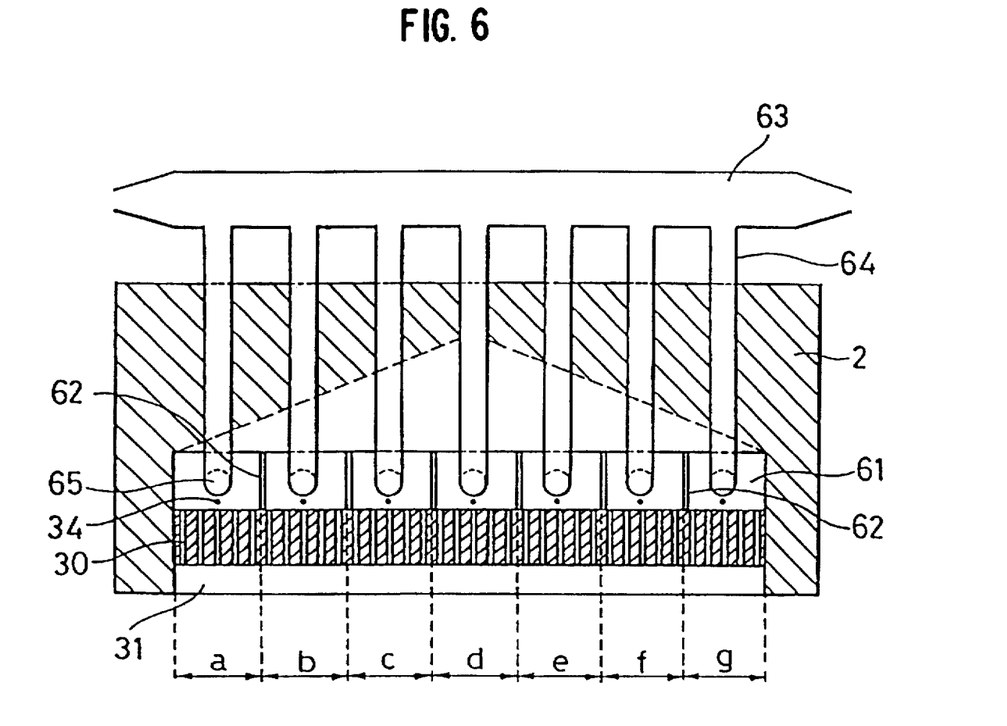
FIG. 6 schematically illustrates a supplying and distributing system of heated gas.

The embodiment of the die for the melt-blowing apparatus according to the present invention wherein the heated gas is used as the nozzle-orifice-portion-temperature-controlling means instead of the embedding-type heater or the surface-mounting-type heater is shown in FIGS. 5 and 6. FIG. 5 is a sectional view taken along a line crosswise to a spinning direction, as in FIG. 1. FIG. 6 is a front sectional view similar to FIG. 3, and schematically illustrates a supplying and distributing system of heated gas. The portions in FIGS. 5 and 6 corresponding to those in FIGS. 1 to 4 are shown by the same reference figures. The heated gas which serves as the nozzle-orifice-portion-temperature-controlling means and at the same time as the gas for drawing the melted resin to fine fibers can heat the nozzle piece 3 by contacting the surface of the nozzle piece 3 when passing through the gas flow path 31 formed from the nozzle piece 3 and the lip plate 4, so that the temperature of nozzle-orifice-surrounding portion 11 in each temperature-controlling zone is maintained at the predetermined level.

In the conventional apparatus, or even in the present die apparatus wherein the temperature control is carried out only by the embedding-type heater or the surface-mounting-type heater, the heated gas for drawing the melted resin to fine fibers is only passed through a gas-heating station (not shown) disposed outside or inside of the die 1, distributed in the gas supplying tube 33 located in the die body 2 in the direction crosswise to the spinning direction, conveyed via the gas supplying path 30 to the gas flow path 31, and blown from the gas flow outlet 32. Accordingly, the gas is collectively heated as a whole in the gas-heating station, but the gas is not heated to a different temperature for each of the zones divided in a lateral direction.

When the heated gas is used as the nozzle-orifice-portion-temperature-controlling means in the present invention, one or more heating means 35 for the gas heating the temperature-controlling zones are disposed for each of the temperature-controlling zones, in the heated gas flow path, such as the gas supplying tube 33, the gas supplying path 30, or the upstream portion of the gas supplying tube 33 disposed inside or outside of the die 1, instead of or preferably in addition to the gas-heating station for collectively heating the gas. The heating means for the gas heating the temperature-controlling zones may be, for example, a heater with an electrically heated wire, such as a sheathed heater, a cartridge heater or a cast-in heater. The heating means for the gas heating the temperature-controlling zones is preferably located at the gas supplying tube 33 where the heated gas is distributed to the direction crosswise to the spinning direction.

As shown in FIG. 6, in is preferable to divide the inside of the gas supplying tube 33 to gas chambers 61 with separating walls 62 correspondingly to the temperature-controlling zones a to g, and further to divide the subsequent gas supplying path 30, gas flow path 31 and the gas outlet 32 correspondingly to the temperature-controlling zones. In this embodiment, the heated gas or the gas to be heated is supplied from a buffer tube 63 located at the outside of the die body 2, into flexible tubes 64 which are disposed for each of the temperature-controlling zones a to g, and also located at the outside of the die body 2, and then conveyed into the gas chambers 61 via gas tube 65. Thus, the temperature control becomes easier for the heated gas in the gas supplying tube correspondingly to each of the temperature-controlling zones divided in the direction crosswise to the spinning direction. The heating means for the gas heating the temperature-controlling zones heats the gas flow in association with the temperature-measuring means located in each temperature-controlling zone heated by passing the heated gas. The gas flow heated as above is guided to the gas flow path 31f and is brought into contact with the nozzle piece 3 when passing through the gas flow path 31, whereby the temperature of each of the temperature-controlling zones can be controlled to a desired level.

When the above heated gas is used as the nozzle-orifice-portion-temperature-controlling means, the temperature-measuring means used may be the embedding-type temperature-measuring means, such as the embedding-type temperature sensor, and/or the non-contacting type temperature-measuring means, such as the infrared radiation thermometer or the infrared thermal imaging apparatus. Further, instead of or in addition to the above temperature-measuring means, a temperature-measuring means, such as a temperature sensor 34, located in the heated gas flow path, such as the gas supplying tube 33 or the gas chambers 61, may be used as the means for indirectly measuring the temperature of the nozzle-orifice-surrounding portion 11. When such a temperature-measuring means is used, the correlation of the temperature at the position, such as the gas supplying tube, where the temperature-measuring means is located, and the temperature of the nozzle-orifice-surrounding portion 11 should be determined for each of the temperature-controlling zones in advance. Then, the temperature of each of the temperature-controlling zones can be controlled to the predetermined level, using the correlation. The temperature sensor used as the temperature-measuring means located in the heated gas flow path may be a known temperature sensor, such as a thermocouple or a temperature-measuring resistance element.

The gas flow path 31 in the present die apparatus may be the same as that used in the conventional apparatus, when the heated gas is used as the nozzle-orifice-portion-temperature-controlling means, and as the gas for drawing the melted resin to fine fibers. When only the heated gas is used as the nozzle-orifice-portion-temperature-controlling means, the width of each temperature-controlling zone in the direction crosswise to the spinning direction is preferably 2 to 20 cm, more preferably 5 to 15 cm. When the heated gas is used as the nozzle-orifice-portion-temperature-controlling means in combination with one or more of the above heaters, the width of each temperature-controlling zone in the direction crosswise to the spinning direction is preferably 2 to 20 cm, more preferably 5 to 15 cm.

A melt-blown nonwoven fabric was actually prepared from polypropylene resin, using a melt-blowing apparatus in accordance with the present invention, as shown in FIGS. 5 and 6. The gas supplying tube 33 was divided into seven gas chambers 61 with the separating walls 62 correspondingly to the seven temperature-controlling zones a to g. In each of the gas chambers 61, a heater 35 and a temperature sensor 34 were disposed. The side heater 26 placed on the side of the die body 2 was set at the temperature of 300° C. The gas having the initial temperature of 320° C. was supplied from each of right and left buffer tubes 63 to each of the gas flow paths at 200 Nm³/hour. The polymer was introduced to the coat-hanger-style distributor at 300 ml/minute. The width of the nozzle piece 3 used was about 1100 mm, and about 1200 nozzle orifices having a diameter of 0.3 mm were disposed in a straight line at equal intervals.

Figure 7:
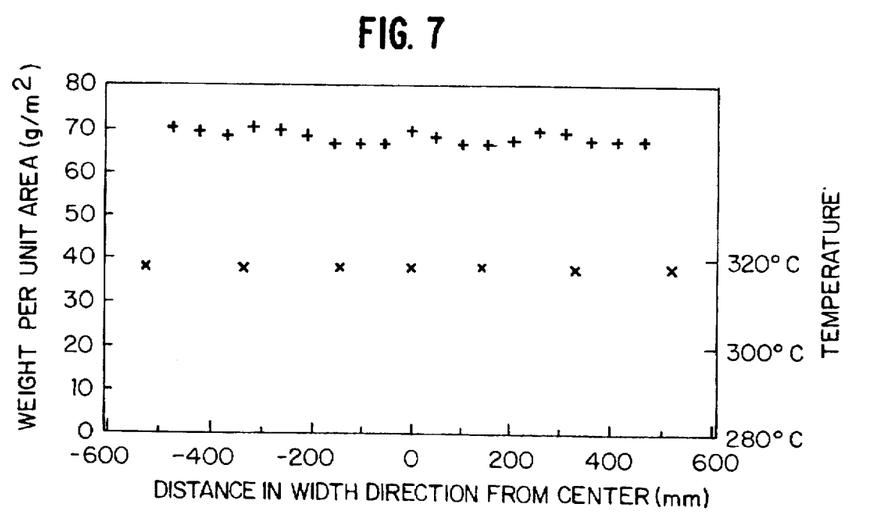
FIG. 7 shows the relationship of the temperature profile of a nozzle-orifice-surrounding portion and the distribution of the weight per unit area of a melt-blown nonwoven fabric prepared in accordance with the present invention.

The temperature of the nozzle-orifice-surrounding portion 11 was correlated with that of the heated gas, and thus was indirectly determined from the heated-gas temperature which was measured by the sensor 34. Further, the divided gases were heated by the heaters 35 to control the temperatures of the seven temperature-controlling zones a to g of the nozzle-orifice-surrounding portion 11 to the predetermined temperature of 320° C. The resulting melt-blown nonwoven fabric was cut at an interval of 5 cm in the width direction (i.e., in the direction crosswise to the spinning direction) to obtain the samples (5 cm ×20 cm). The weight per unit area of each sample was measured. The result is shown in FIG. 7 wherein + means the weight per unit area and x means the temperature. It is apparent therefrom that the weight per unit area was uniform.

Figure 8:
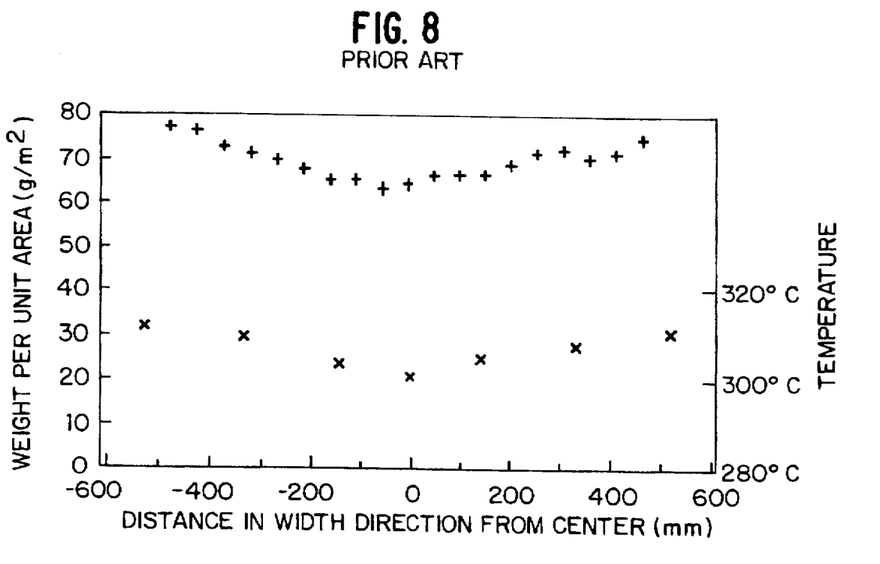
FIG. 8 shows the relationship of the temperature profile of a nozzle-orifice-surrounding portion and the distribution of the weight per unit area of a melt-blown nonwoven fabric prepared in accordance with the conventional method.

The above procedure was repeated, except that the heaters 35 were not used to heat the gases to obtain a melt-blown nonwoven fabric for a comparison. The result is shown in FIG. 8. It is apparent therefrom that the temperature of the heated gas was lowered at the central portion in the direction crosswise to the spinning direction, and the temperature of the heated gas was relatively high at the edge portions, and that the weight per unit area was lowered at the central portion in the direction crosswise to the spinning direction, and the weight per unit area was relatively high at the edge portions. Therefore, it is seen that the temperature of the nozzle-orifice-surrounding portion can be controlled by controlling the temperature of the heated gas, and thus, the distribution of the weight per unit area of the melt-blown nonwoven fabric can be controlled in the direction crosswise to the spinning direction by controlling the temperature of the heated gas in each of the temperature-controlling zones.

Although the heating means, such as the embedding-type or surface-mounting-type heater, or the heated gas, have been described as the nozzle-orifice-portion-temperature-controlling means, the purpose for disposing such temperature-controlling means is to maintain the temperature of the nozzle-orifice-surrounding portion of each temperature-controlling zone at the predetermined level, and to thereby uniformly spin the melted resin from each nozzle orifice. When the temperature of the nozzle-orifice-surrounding portion is determined by the temperature-measuring means to be lower than the predetermined level, the nozzle-orifice-surrounding portion is heated by the temperature-controlling means, i.e., the heating means, to the predetermined level, as explained above. However, when the temperature of the nozzle-orifice-surrounding portion is higher than the predetermined level, the nozzle-orifice-surrounding portion must be cooled by the temperature-controlling means to the predetermined level.

When cooling, the embedding-type or surface-mounting-type heater is turned off, or the output thereof is extremely reduced. As a positive cooling means, a cooling medium, such as cooling water, may be used instead of the heater. When the heated gas is used as the temperature-controlling means, it is possible to cool the nozzle-orifice-surrounding portion to the predetermined temperature by adjusting the output of the heating means for the gas heating the temperature-controlling zones to supply the heated gas having the temperature lower than that of the nozzle-orifice-surrounding portion.

In the present invention, it is preferable to adjust the temperature of the melted resin lower than the predetermined level at the nozzle-orifice-surrounding portion, and use the heating means as the nozzle-orifice-portion-temperature-controlling means, even when the conventional side heater 26 or the conventional coat-hanger-distributor-heater is used in combination or not used. It is preferable to approximately control the temperature of the melted resin by a temperature sensor disposed at the portion near the coat-hanger type distributor as well as the side heater 26 or the coat-hanger-distributor-heater. It is also possible to maintain the temperature of the melted resin higher than the predetermined level at the nozzle-orifice-surrounding portion, and cool the same by the temperature-controlling means disposed at the nozzle-orifice-surrounding portion.

The die for a melt-blowing apparatus according to the present invention has a structure wherein the temperature-measuring means disposed at the nozzle piece and the nozzle-orifice-portion-temperature-controlling means are newly added to the conventional die for a melt-blowing apparatus. Therefore, the melted resins, the heated gas, the shape of the flow path for the melted resins, such as the nozzle orifice or the coat-hanger type distributor, or the shape of the heated gas flow path may be the same as those in the conventional methods, so long as the advantageous effects of the present invention can be obtained.

The die for a melt-blowing apparatus according to the present invention is not limited to the explained embodiments, and may be appropriately modified within the scope of the present invention. For example, any temperature-measuring means other than the described ones may be used, so long as it can directly or indirectly measure the temperature of the nozzle-orifice-surrounding portion. Further, any temperature-controlling means other than the described ones may be used, so long as it can control the temperature of the nozzle-orifice-surrounding portion of each of the temperature-controlling zones to the predetermined level in association with the temperature-measuring means.

As explained, the present invention is based on the finding of the present inventor that the amount of the melted resin spun from each nozzle orifice can be accurately controlled by controlling the temperature profile of the nozzle-orifice-surrounding portion and the nozzle orifices in the direction crosswise to the spinning direction, because the temperature of the nozzle-orifice-surrounding portion is substantially the same as that of the melted resin in the nozzle orifice within the same temperature-controlling zone.

The reason therefor will be assumed hereinafter, but the present invention is not limited thereby. In a total pressure loss from the inlet of the melted resin to the orifice outlets, only a very small pressure loss is caused from the inlet of the melted resin to the middle guiding portion. The pressure loss in the nozzle orifices accounts for almost all the total pressure loss. Therefore, it is believed that a pressure profile is uniform at the upper portion of the nozzle orifices. Thus, the pressure loss of each of the nozzle orifices is the difference between the pressure at the upper portion of the nozzle orifices and atmospheric pressure, and thus, is identical to each other. If the bore size and the length of the nozzle orifices are identical to each other, the pressure loss in each nozzle orifice varies with viscosity and flow rate.

In fact, the present inventor measured the temperature profile of the nozzle-orifice-surrounding portions, when the distribution of the amounts of the melted resin spun was not uniform in the direction crosswise to the spinning direction, and found that the temperature profile was approximately correlated to the distribution of the melted resin. It is apparent that if there exists a portion having a higher temperature in the temperature profile in the direction crosswise to the spinning direction, the viscosity of the melted resin is lowered, and the pressure loss is rendered to the same level as that in the other portion by increasing the flow rate.

The viscosity of the melted resin depends on the temperature, and as a result, the amount of the resin spun depends on the temperature of the nozzle-orifice-surrounding portion. It is, therefore, assumed that the amount of the resin spun can be accurately controlled by controlling the temperature of the nozzle-orifice-surrounding portion.

In the conventional methods, on the contrary, the temperature of the melted resin was uniformly controlled at the coat-hanger type distributor in the die body. As explained above, it is not possible to uniformly spin the melted resin in the direction crosswise to the spinning direction. The reason therefor is considered on the basis on the above assumption that because the inside structure of the die is not uniform in the direction crosswise to the spinning direction, and thus, the heat is not uniformly received from the heating means by heat conduction and the heat is not uniformly dissipated from the die. Hence, the temperatures of the nozzle-orifice-surrounding portions are not uniform even if the temperature at the coat-hanger type distributor is uniform. Further, it is assumed that because the temperature of the heated gas is not controlled in the die, the heat transfer between the heated gas and the nozzle piece is one of the causes.

As above, according to the die for a melt-blowing apparatus, the temperature profile of the nozzle-orifice-surrounding portion in the direction crosswise to the spinning direction can be rapidly and accurately controlled to the predetermined temperature, and thus, the distribution of the amounts of the melted resin spun can be accurately controlled in the direction crosswise to the spinning direction. For example, the distribution of the melted resin can be controlled uniformly in the direction crosswise to the spinning direction, by controlling the temperature profile of the nozzle-orifice-surrounding portion to a uniform level in the direction crosswise to the spinning direction. Therefore, a melt-blown nonwoven fabric having a uniform distribution of the weight per unit area can be obtained.

Further, because the temperature of the nozzle-orifice-surrounding portion is almost accurately correlated to the amounts of the melted resins spun, the distribution of the melted resin can be rapidly adjusted only by adjusting the temperature profile of the nozzle-orifice-surrounding portion in the direction crosswise to the spinning direction when producing the nonwoven fabric.

Although the present invention has been described with reference to specific embodiments, various changes and modifications obvious to those skilled in the art are deemed to be within the spirit, scope, and concept of the invention.

I claim:

1. A die for a melt-blowing apparatus, comprising a die body, a nozzle piece and a lip plate, wherein said die body includes a passage for distributing melted resin, said nozzle piece includes at least one row of nozzle orifices and is connected to said die body so that said nozzle orifices receive said melted resin from said die body, said lip plate includes a spinning opening aligned to receive the resin exiting said nozzle orifices such that gas flow paths are formed between said lip plate and said nozzle piece which extend to said spinning opening for blowing gas onto resin exiting said nozzle orifices, wherein said gas flow path further comprises a gas supplying tube located in said die body, a gas supplying path and a gas flow outlet, wherein said nozzle piece is divided into plural temperature-controlling zones in a direction crosswise to a spinning direction, wherein said gas supplying tube is further divided to a multiplicity of gas chambers with a multiplicity of separating walls corresponding to said temperature-controlling zones, wherein one or more heating means are disposed for each of said temperature-controlling zones in said gas flow path to heat the gas which is brought into contact with said nozzle piece when passing through said gas flow path, a means for measuring a temperature at a portion surrounding one of said nozzle orifices in said nozzle piece is disposed for each of said divided temperature-controlling zones, and heated gas is applied at said portion surrounding said one nozzle orifice whereby the temperature of the nozzle orifice surrounding portions in each of said temperature controlling zones is maintained uniformally at a predetermined temperature.

2. The die according to claim 1, wherein said means for measuring a temperature is a means for directly measuring a temperature at said portion surrounding said nozzle orifice.

3. The die according to claim 2, wherein said measuring means is located in said nozzle piece.

4. The die according to claim 1, wherein said means for measuring a temperature is a means for indirectly measuring said temperature at said portion surrounding said nozzle orifice.

5. The die according to claim 4, wherein said measuring means is a non-contacting measuring means.

6. The die according to claim 1, wherein one or more measuring means are disposed for each of said temperature-controlling zones in said gas flow path to measure the temperature of the gas which is brought into contact with said nozzle piece when passing through said gas flow path.

* * * * *